(12) United States Patent
Jespersen et al.

(10) Patent No.: US 11,590,721 B2
(45) Date of Patent: Feb. 28, 2023

(54) SYSTEM AND METHOD FOR MANUFACTURING A REINFORCED WIND TURBINE BLADE

(71) Applicant: LM WIND POWER INTERNATIONAL TECHNOLOGY II APS, Kolding (DK)

(72) Inventors: Klavs Jespersen, Kolding (DK); Lars Nielsen, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 383 days.

(21) Appl. No.: 16/772,607

(22) PCT Filed: Dec. 10, 2018

(86) PCT No.: PCT/EP2018/084178
§ 371 (c)(1),
(2) Date: Jun. 12, 2020

(87) PCT Pub. No.: WO2019/115457
PCT Pub. Date: Jun. 20, 2019

(65) Prior Publication Data
US 2021/0078277 A1  Mar. 18, 2021

(30) Foreign Application Priority Data
Dec. 14, 2017 (EP) .................................... 17207312

(51) Int. Cl.
*B29D 99/00* (2010.01)
*B29C 70/44* (2006.01)
(Continued)

(52) U.S. Cl.
CPC ........ *B29D 99/0028* (2013.01); *B29C 70/443* (2013.01); *B29C 70/541* (2013.01); *F03D 1/0675* (2013.01); *B29L 2031/085* (2013.01)

(58) Field of Classification Search
CPC . B29D 99/0028; B29C 70/443; B29C 70/541; B29L 2031/085; F03D 1/0675
See application file for complete search history.

(56) References Cited

U.S. PATENT DOCUMENTS

| 3,713,753 A | * | 1/1973 | Brunsch | B29C 70/545 |
| | | | | 416/241 A |
| 10,040,255 B2 | * | 8/2018 | Schibsbye | B29C 70/38 |

(Continued)

FOREIGN PATENT DOCUMENTS

| GB | 2530072 A | * | 3/2016 | ............ B29B 11/16 |
| WO | 2013/113815 A1 | | 8/2013 | |
| WO | 2015/114098 A1 | | 8/2015 | |

OTHER PUBLICATIONS

International Search Report dated Feb. 25, 2019 issued in corresponding International Application No. PCT/EP2018/084178.

*Primary Examiner* — Robert B Davis
(74) *Attorney, Agent, or Firm* — Nath, Goldberg & Meyer; Jerald L. Meyer; Tanya E. Harkins

(57) ABSTRACT

The present invention relates to a method and system for manufacturing a wind turbine blade. The method comprising the steps of forming a cured blade element (102) of a first blade shell, forming a cured blade element (102) of a second blade shell, transferring the cured blade element (102) of the first blade shell to a first cradle (92), and transferring the cured blade element (102) of the second blade shell to a second cradle (94). Each cradle comprises a mould body (96, 98) having a moulding surface for abutting against a surface of the cured blade element to advantageously form a seal therebetween.

16 Claims, 5 Drawing Sheets

(51) Int. Cl.
*B29C 70/54* (2006.01)
*F03D 1/06* (2006.01)
*B29L 31/08* (2006.01)

(56) References Cited

U.S. PATENT DOCUMENTS

| | | | | |
|---|---|---|---|---|
| 2003/0091679 | A1* | 5/2003 | Aramburu | B29C 33/26 |
| | | | | 425/384 |
| 2012/0107129 | A1* | 5/2012 | Kulenkampff | B29C 66/61 |
| | | | | 29/889.71 |
| 2012/0138218 | A1* | 6/2012 | Dean | B29D 99/0028 |
| | | | | 156/243 |
| 2014/0322023 | A1* | 10/2014 | Tapia | B23P 15/04 |
| | | | | 416/223 R |
| 2015/0224721 | A1* | 8/2015 | Bendel | F01D 5/147 |
| | | | | 264/553 |
| 2015/0308404 | A1 | 10/2015 | Dahl et al. | |

* cited by examiner

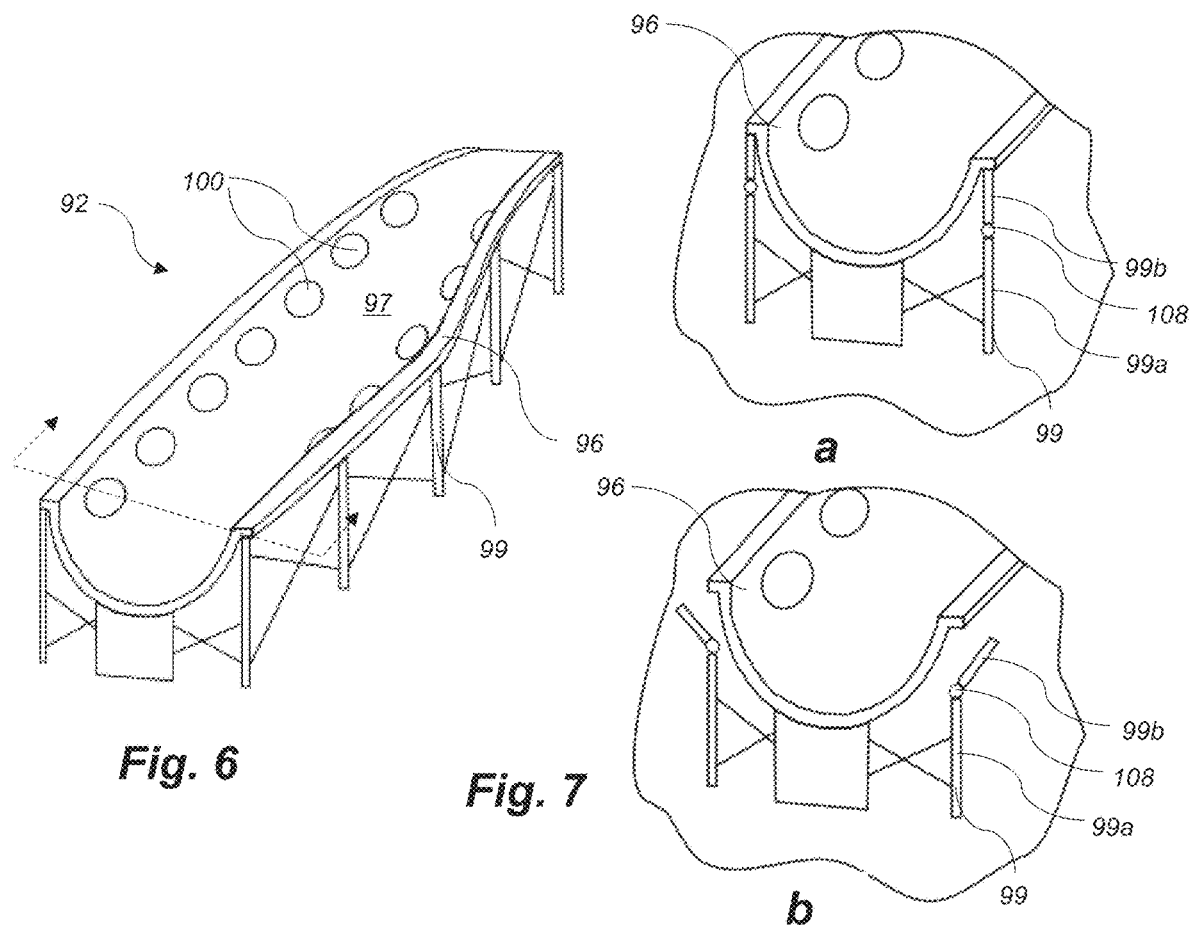
Fig. 6
Fig. 7
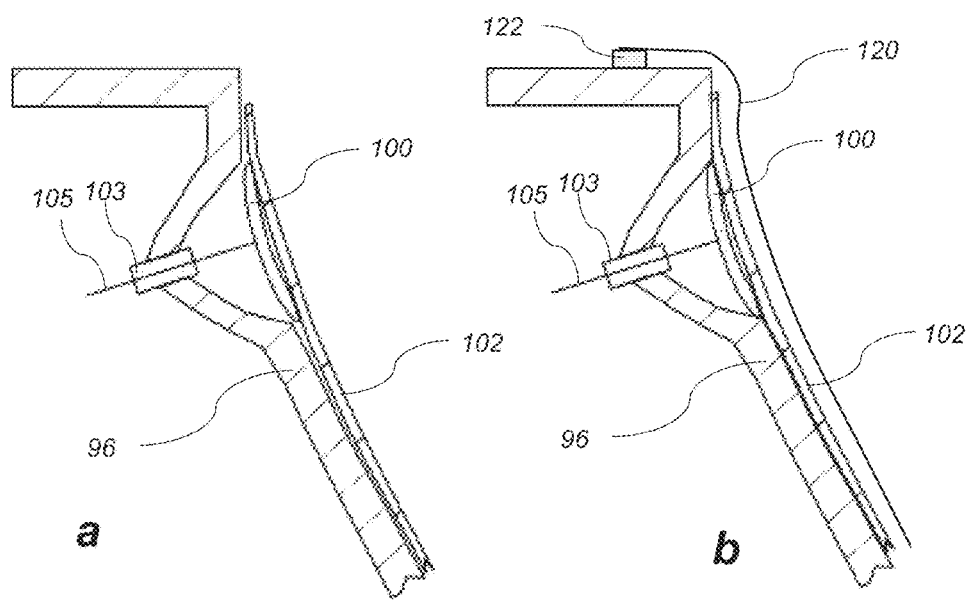
Fig. 8

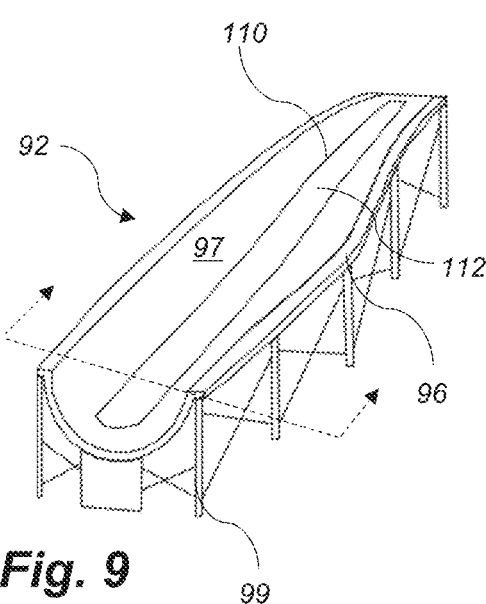
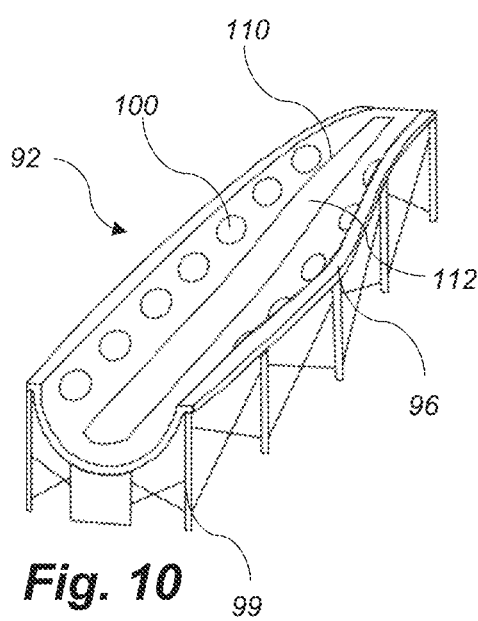
Fig. 9  Fig. 10
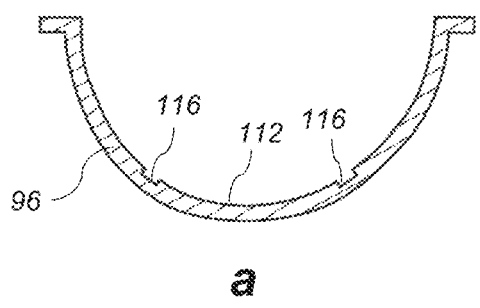
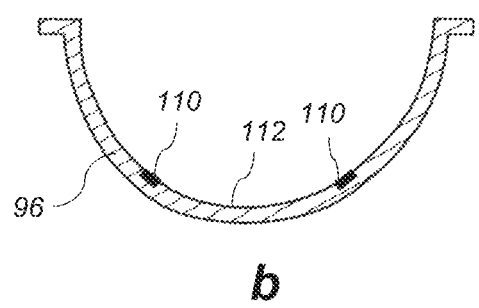
a  b
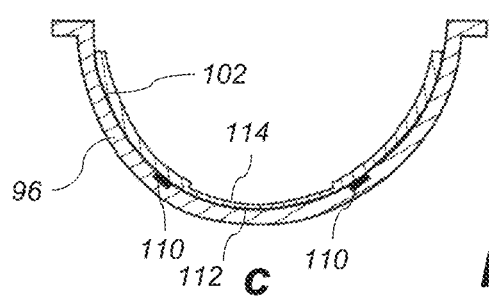
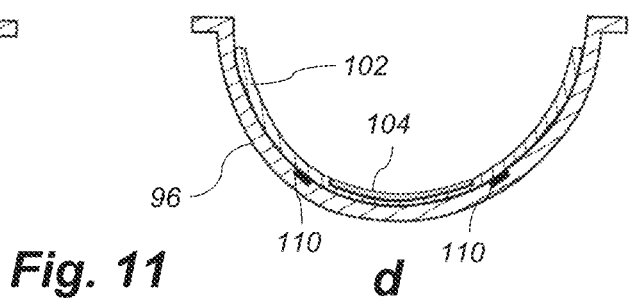
Fig. 11  c  d
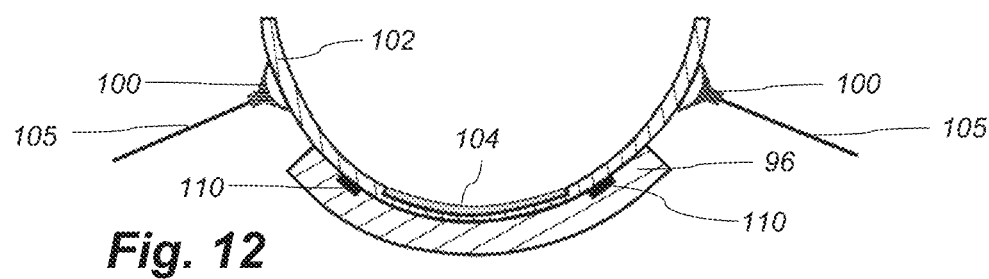
Fig. 12

SYSTEM AND METHOD FOR MANUFACTURING A REINFORCED WIND TURBINE BLADE

This is a National Phase Application filed under 35 U.S.C. 371 as a national stage of PCT/EP2018/084178, filed Dec. 10, 2018, an application claiming the benefit of European Application No. 17207312.4, filed Dec. 14, 2017, the content of each of which is hereby incorporated by reference in its entirety.

FIELD OF THE INVENTION

The present invention relates to a system and method for manufacturing a reinforced wind turbine blade, as well as to a wind turbine blade obtainable by said method.

BACKGROUND OF THE INVENTION

Wind turbine blades are typically manufactured using first and second blade shells, moulded in a pair of adjacent blade moulds. First, a blade gel coat or primer is typically applied to the blade mould. Subsequently, fibre reinforcement and/or fabrics are placed into the mould followed by resin infusion. A vacuum is typically used to draw epoxy resin material into a mould. Alternatively, prepreg technology can be used, in which a fibre or fabric pre-impregnated with resin forms a homogenous material which can be introduced into the mould.

Once the blade shells have sufficiently cured, the vacuum bags are removed and further operations can be performed on the hardened shells. For example, blade laminates and/or webs can be installed in the blade shells, various repair or patching operations may be carried out on the shells such as grinding of shell surfaces.

The shell halves are assembled by being glued or bolted together substantially along a chord plane of the blade. To this end, an adhesive glue is applied to the edges of the shells while in the moulds. The blade moulds are linked via a hinged turning mechanism, and a first of the blade moulds, containing a first of the blade shells, is accordingly turned relative to the second mould and shell, such that the first shell is positioned above the second shell. This allows for the blade shells to be closed together along the edge of the shells, to form a complete wind turbine blade having an upwind and a downwind side. To allow for secure bonding of the shells together, a suitable pressure is maintained along the exterior surfaces of the blade shells by the blade moulds, usually for approximately 3-4 hours.

Once the complete wind turbine blade is fully adhered, the first blade mould may be hinged back to an open state, allowing access to the contained wind turbine blade. The blade can then be de-moulded from the second blade mould, and supported using blade carts to perform additional production operations, e.g. grinding of the external blade surface, coating, etc.

High-quality blade moulds are one of the most expensive pieces of equipment in the blade manufacturing process, requiring extensive tooling and manufacture before use to ensure accurate reproduction of desired blade profiles, as well as to allow for the turning of the moulds to bond blade shell parts together. In addition, even a minor difference in blade characteristics such as length, camber, etc. will in general require a completely new blade mould for the manufacturing process.

Blade moulds in use in current processes can cost approximately €1-3 million to manufacture and, dependent on where the moulds are made, extensive transportation time may be a factor before a new mould can be used at a manufacturing plant. This introduces considerable expense and lead time in the implementation of a manufacturing process for a new wind turbine blade. Accordingly, one of the limitations to efficient implementation of wind turbine technology is the time required for the initial setup of a blade manufacturing system. A further limitation is the time taken for the manufacturing of individual blades within such a system.

International Patent Application WO 2013/113815 A1 discloses a blade manufacturing using a dedicated post-moulding station in the manufacturing process. A blade shell forming part of a wind turbine blade is initially moulded in a blade mould, the blade shell subsequently transferred to a post-moulding station which allows for various post-moulding operations to be carried out on the blade shell away from the mould, thereby increasing the productivity of the blade mould in the manufacturing process. The post-moulding station may be operable to perform the closing of first and second blade shells to form a wind turbine blade.

It has been found by the present inventors that such prior art systems and methods present certain limitations, in particular when using a two-step infusion process in which different blade elements, such as reinforced structures like spar caps or main laminates, are moulded and infused subsequent to a first moulding and infusion of another blade element. An example of such two-step moulding approach is found in WO 2015/114098 A1.

It is therefore a first object of the invention to provide a system and a method for manufacturing a wind turbine blade which overcomes these limitations.

In particular, it is an object of the present invention to enable a flexible and effective moulding operation, which saves time and cost, and which results in improved stability of the resulting wind turbine blade.

SUMMARY OF THE INVENTION

Accordingly, in a first aspect, the present invention relates to a method of manufacturing a wind turbine blade, the method comprising the steps of:
  forming a cured blade element of a first blade shell,
  forming a cured blade element of a second blade shell,
  transferring the cured blade element of the first blade shell to a first cradle,
  transferring the cured blade element of the second blade shell to a second cradle, wherein each cradle comprises a mould body having a moulding surface, and wherein each cured blade element is arranged in its respective cradle such that the moulding surface, or a part thereof, abuts against a surface of the cured blade element,
  forming a reinforced section on the cured blade element of the first blade shell in the first cradle,
  forming a reinforced section on the cured blade element of the second blade shell in the second cradle,
  closing said first and second blade shells to form a closed wind turbine blade shell, and
  bonding said first and second blade shells in said closed wind turbine blade shell to form a wind turbine blade.

It has been found by the present inventors that carrying out the steps of forming the reinforced section, and preferably closing the blade shell, using the cradles provides for a greater throughput of wind turbine blades manufactured according to the method of the present invention. In addition, this allows for an improved geometry fit and support of the cured blade element.

According to a preferred embodiment, each cured blade element is arranged in its respective cradle such that a section of the moulding surface is placed underneath a part of the cured blade element, said part comprising a recess for receiving the reinforced section. Typically, the cured blade element will comprise a top surface and an opposing bottom surface. The top surface will usually be located on the inside of the completed wind turbine blade, while the bottom surface will usually be located on the outside of the completed wind turbine blade. It is preferred that the cured blade element is manufactured comprising a recess, preferably located in its top surface, for later forming of an integrated reinforced section therein. Thus, in some embodiments, each cured blade element is arranged in its respective cradle such that a section of the moulding surface is in contact with a section of a bottom surface of the cured blade element, wherein said section of the bottom surface is opposed by a section of a top surface of the cured blade element, said section of the top surface comprising a recess for receiving the reinforced section.

In a preferred embodiment, each cured blade element is arranged in its respective cradle such that the moulding surface, or a part thereof, abuts against a surface of the cured blade element to form a seal therebetween. By providing a cradle with a mould body comprising a moulding surface for providing a seal with a surface of the cured element, the formation of the reinforced section is greatly facilitated, in particular when using vacuum assisted techniques such as vacuum assisted resin transfer moulding (VARTM) for resin infusion when forming the reinforced section. This applies in particular in comparison with a system, in which the reinforced section is formed on the cured blade element without any underlying seal-forming moulding surface, such as a mere open cradle structure. Unlike such prior art systems, the formation of the reinforced section no longer depends on the vacuum tightness of the blade element when using the method and system of the present invention since the seal formed with the moulding surface prevents breaking of the vacuum applied during resin infusion.

Preferably, the cured blade element of the first blade shell is formed in a first blade mould. Likewise, the cured blade element of the second blade shell is preferably formed in a second blade mould. Each cured blade element may be a cured blade shell comprising a recess for later formation of a reinforced section therein. The recess is preferably located in an upper surface of the cured blade element.

A cured blade element according to the present invention will usually be a cured blade shell, which preferably comprises a recess. A cured blade element is typically an element of a blade shell which has been substantially cured by a curing operation, preferably to a level where the blade element can be handled without undergoing significant deformation of its structure. The duration of the curing operation performed will depend on the type of curing resin used in the manufacture of the blade elements, but may be of the order of 2-3 hours using standard resins. However, it will be understood that the blade elements may continue to undergo a curing process for several hours after the denoted curing operation.

The cured blade element of the first blade shell will usually have a different shape than the cured blade element of the second blade shell.

Advantageously, the cured blade element may substantially correspond to an aerodynamic blade shell, wherein a recess may be formed in the blade element for receiving the reinforced section in the later step. Thus, a secondary fibre material may be arranged in said recess. Thus, the less critical step of forming an aerodynamic shell and the more critical part of forming a load carrying structure may be separated. By forming a recess in the cured blade element, such as an aerodynamic shell, the secondary fibre material may more easily be arranged without the fibre layers wrinkling and forming mechanically weak areas. Performing the two steps at different locations means that the two steps can be carried in sequence and the throughput can be increased, since it is possible to work on two different blade shell parts simultaneously.

It is preferred that the moulding surface of the mould body, or a part thereof, abuts against a bottom surface of the cured blade element to form a seal therebetween. The cured blade element will typically comprise an upward directed top surface and an opposing downward directed bottom surface, wherein a recess for forming a reinforced section on the cured blade element will typically be located in the top surface.

Preferably, the moulding surface of the mould body for providing a seal with a surface of the cured element corresponds at least in part to a surface of an upwind or downwind blade shell. In another embodiment, the moulding surface of the mould body corresponds fully to a surface of an upwind or downwind blade shell. It is preferred that the seal formed between the moulding surface and a surface of the cured blade element is an air-tight seal. In other embodiments, the seal may be a vacuum-tight seal or a hermetic seal.

In some embodiments, each cured blade element is arranged in its respective cradle such that the moulding surface is in contact with the lowest point of the outer surface of the cured blade element, as seen in a cross section of the cured blade element. In other words, each cured blade element may be arranged in its respective cradle such that the moulding surface is in contact with the vertex or minimum point of the outer surface of the cured blade element, as seen in a cross section of the cured blade element. In other words, each cured blade element may be arranged in its respective cradle such that the moulding surface is in contact with a point of the outer surface of the cured blade element which has the maximum distance to the chord line of the completed wind turbine blade, as seen in a cross section of the cured blade element.

It is preferred that, each cured blade element is arranged in its respective cradle such that the moulding surface is in contact with at least 20%, such as at least 30% or at least 40% of the outer surface of the cured blade element. It is particularly preferred that each cured blade element is arranged in its respective cradle such that the moulding surface is in contact with at least 50%, such as at least 60% or at least 70% of the outer surface of the cured blade element.

In another embodiment, the cradle comprises a plurality of movable suction cups for engaging a surface of the cured blade element. The suction cups are preferably movable between an advanced position for engaging a surface of the cured blade element and a retracted position for forcing a surface of the cured blade element against the moulding surface of the mould body of the cradle.

In a preferred embodiment, the mould body comprises a plurality of movable suction cups embedded in the moulding surface for engaging a surface of the cured blade element. Preferably, the suction cups are linearly displaceable.

In a preferred embodiment, each suction cup is movable via an airtight passage provided within the mould body. Such airtight passage may be provided by an airtight sleeve or sheath arranged within the mould body, allowing linear movement of a support member, such as a rod or bar, to which the suction cup is fixed. The support member may be connected to an actuator, such as a pneumatic or hydraulic actuator, for effecting movement of the support member and the suction cup.

In one embodiment, the mould body comprises at least two, such as at least three, at least four, at least five, or at least six, movable suction cups embedded in the moulding surface for engaging a surface of the cured blade element.

According to another embodiment, the suction cups are movable between an advanced position for engaging a surface of the cured blade element and a retracted position for forcing a surface of the cured blade element against the moulding surface of the mould body. Thus, the air-tightness between the moulding surface and a lower surface of the cured blade element may be increased, thus allowing for more efficient vacuum-assisted moulding of the reinforced section.

In a preferred embodiment, the moulding surface of the mould body comprises one or more sealing elements. The sealing element(s) may protrude beyond the surrounding moulding surface. In other embodiments, the sealing elements may be flush with the surrounding moulding surface. In one embodiment, the sealing elements are elastically deformable. They could, for example, be made of rubber. Providing one or more sealing elements may assist in forming a seal between the moulding surface and a surface of the cured blade element. The sealing element may take the form of a lining or strip. According to another embodiment, the sealing element is a sealing strip. In a preferred embodiment, such sealing strip may enclose a section of the moulding surface.

In a preferred embodiment, each cured blade element is arranged in its respective cradle such that a section of the moulding surface enclosed by the sealing element is placed underneath a part of the cured blade element, said part comprising a recess for receiving the reinforced section. Typically, the cured blade element will comprise a top surface and an opposing bottom surface. The top surface will usually be located on the inside of the completed wind turbine blade, while the bottom surface will usually be located on the outside of the completed wind turbine blade. It is preferred that the cured blade element is manufactured comprising a recess, preferably located in its top surface, for later forming of an integrated reinforced section therein. In a preferred embodiment, each cured blade element is arranged in its respective cradle such that a section of the moulding surface enclosed by the sealing element is in contact with a section of a bottom surface of the cured blade element, wherein said section of the bottom surface is opposed by a section of a top surface of the cured blade element, said section of the top surface comprising a recess for receiving the reinforced section.

According to another embodiment, the mould body, or a part thereof, is deformable, preferably elastically deformable. This allows for adjusting the positions of the leading edge and the trailing edge of the shell prior to the closing and bonding operations.

According to another embodiment, each cradle comprises a support frame for supporting the mould body. In a preferred embodiment, such support frame may be a substantially open-frame structure. The support frame may comprise a plurality of support members to support a mould body according to the present invention. In one embodiment, the support frame comprises one or more stationary support members and one or more movable support member, each hinged to a stationary support member. In particular in combination with a deformable mould body, this mechanism may be used to adjust the leading and trailing edges of the blade shells prior to closing and bonding.

In a preferred embodiment, the first cradle is hingedly coupled to the second cradle. This allows for closing the blade shells after completion of the reinforced sections, and other possible post-moulding operations, without a need for moving the blade shells. According to another embodiment, the reinforced section is a main laminate, a spar cap or a spar beam. The reinforced section is preferably an intergrated reinforced section.

According to another embodiment, forming the cured blade elements comprises the steps of laying up a primary fibre material in a mould, infusing said primary fibre material with a primary resin, and substantially curing said primary resin in said primary fibre material to form a cured blade element.

In a preferred embodiment, the step of forming the reinforced section comprises the steps of laying up a secondary fibre material on top of at least a portion of said cured blade element, infusing said secondary fibre material with a secondary resin and curing said secondary resin in said secondary fibre material to form the reinforced section on said cured blade element.

According to another embodiment, the step of forming the reinforced section comprises the step of, after laying up said secondary fibre material, applying a vacuum bag over said secondary fibre material, and wherein said step of infusing said secondary fibre material with a secondary resin comprises a vacuum infusion process. In a preferred embodiment, a vacuum bag is applied over the cured blade element, wherein the vacuum bag is fixed by an adhesive tape, which is applied on an edge of the mould body prior to resin infusion. The adhesive tape may be a vacuum bag sealant tape known in the art such as Tacky Tape® as manufactured by ITW Polymers Sealants North America.

In a preferred embodiment, the step of laying up said primary fibre material comprises arranging said primary fibre material in a mould to define a recess to receive a reinforced section, wherein the step of laying up said secondary fibre material comprises arranging said secondary fibre material in said recess. Thus, the secondary material may be arranged within said recess, which will simplify the layup procedure and ensure that a proper transition from the cured blade element to the integrally formed reinforced section is obtained.

According to another embodiment, said primary resin comprises a relatively low-strength resin, e.g. polyester. According to another embodiment, said secondary resin comprises a relatively high-strength resin, e.g. vinylester, epoxy, polyurethane, or a hybrid resin.

In a preferred embodiment, at least one of said first or second blade shells forms an upwind blade shell or a downwind blade shell. Preferably, the first cradle is arranged to receive a cured blade element of a pressure side shell of a wind turbine blade, while the second cradle is arranged to receive a cured blade element of a suction side shell of a wind turbine blade.

According to another embodiment, the method comprises the step of turning said first blade shell relative to said second blade shell to form a closed blade shell, wherein the bonding step is performed on the closed blade shell to form a wind turbine blade.

According to another embodiment, the bonding step comprises moving the first cradle containing the first blade shell relative to the second cradle containing the second blade shell, to close said first and second blade shells to form a wind turbine blade. Preferably, the first cradle is hingedly coupled to the second cradle, wherein the step of moving comprises hinging said first cradle or said second cradle to close said first and second blade shells.

The cradles may be further used as turning devices. As an alternative, there could be a separate station used for turning operations, wherein the blade shells are moved from the post-moulding station to the turning station after post-moulding operations are completed.

In a preferred embodiment, the method further comprises the step of aligning the first blade shell with the second blade shell such that a leading edge and a trailing edge of the first blade shell are in register with a respective leading edge and a respective trailing edge of the second blade shell during said bonding step. Preferably, said step of aligning comprises translationally moving at least one of said first and second cradles, preferably, relative to the other of said first and second cradles, to align the first and second blade shells contained within said first and second cradles. The cradles are preferably positioned such that initially the leading edge side of said first blade shell is provided adjacent the leading edge side of said second blade shell. The step of moving (preferably hinging) is performed such that the trailing edge side of said first blade shell is brought into contact with the trailing edge side of said second blade shell.

The method of the present invention may also comprise a step of performing at least one post-moulding operation on at least one of said first and second blade shells in the cradles. In one embodiment, the bonding step is performed subsequent to said at least one post-moulding operation. The post-moulding operation may involve a blade shell repair operation, a blade shell grinding operation, a blade root flange coupling operation, a blade web installation operation, a gluing operation, a coating operation, an assembly operation to assemble at least two separate sections of a wind turbine blade shell to form a single wind turbine blade shell, an overlamination operation, installation of blade sensor systems, installation of blade lightning protection systems, a geometry check operation, a geometry adjustment operation to push or pull portions of the blade shell into position, a secondary curing operation in for example an oven, additions of external components, e.g. aero devices, fans, spoilers, stall fences, or any other suitable manufacturing or assembly operations, or any suitable non-destructive testing activity, e.g. wrinkle measurements, ultra sonic thickness measurement, phased array testing of glue bonds, etc.

The method of manufacture is used to manufacture a blade for a wind turbine in a quick and efficient manner, at a manufacturing location. In one embodiment, said cradles are provided local to, preferably adjacent to the blade mould, to provide for a relatively short transfer distance between the blade mould and the cradles. Further preferably, said bonding step is performed local to said cradles, preferably using said cradles. In an alternative embodiment, the cured blade elements may be transported from the moulding location to remote cradles.

Preferably, said wind turbine blade shells are load-bearing wind turbine blade shells. It will be understood that the step of forming cured blade elements comprises curing said blade elements to a level wherein the blade elements may be handled and transferred from a blade mould to a cradle without deformation.

The first and second cradles may comprise a plurality of support members to provide support to the mould body. The method may comprise the step of removing at least one of said support members to provide access to the mould body and/or to a surface of at least one of said first and second blade shells, to facilitate a step of performing a post-moulding operation.

Preferably, the steps of transferring comprise demoulding the respective cured blade elements from a respective blade moulds. Preferably, said step of transferring comprises applying a vacuum lifting force to the cured blade elements to demould said first and second cured blade shells.

Preferably, a step of performing at least one post-moulding operation comprises applying an adhesive at a leading edge and a trailing edge of at least one of said first and second blade shells, wherein said step of bonding comprises arranging said first and second blade shells to adhere the leading edge of the first blade shell to the leading edge of the second blade shell, and to adhere the trailing edge of the first blade shell to the trailing edge of the second blade shell.

It will be understood that the invention is not limited to a direct connection between the respective leading and trailing edges of the shells, e.g. a tail piece or insert may be positioned between the leading edges and/or trailing edges of the shells.

Preferably, said first and second blade shells have a profiled contour dependent on the wind turbine blade to be manufactured. Preferably, the method comprises the step of providing at least one of said first blade mould and said second blade mould for forming the cured blade elements as a substantially fixed blade mould. Preferably, the blade mould has substantially rigid foundations, e.g. concrete foundations. Providing the blade moulds as fixed installations means that the moulds can be relatively easily produced, and mould costs can be kept relatively low.

Preferably, the method comprises the step of laying up a fibre-based material in an internal surface of a blade mould to form an uncured blade element of a blade shell. The lay-up operation may be used for both of the blade elements of the respective first and second blade shells, to form uncured first and second blade elements. The lay-up may be a manual or hand lay-up operation, or an automatic lay-up operation, e.g. spray lay-up, tape lay-up, fibre pultrusion, automotive lay-up of plies, etc.

Preferably, the step of forming a cured blade element of a blade shell comprises infusing said uncured blade element with a resin to cure the blade element. This infusion step may be an automatic or a manual process. Preferably, the method further comprises, following said transferring step, iteratively repeating said steps of laying up and curing in said first and second blade moulds, to provide subsequent cured blade elements.

By performing the next lay-up and curing operation using the moulds freed up by the step of transferring, the productivity rate of the moulds is greatly increased, as a new moulding operation can be performed as soon as the curing of the previous blade shells is completed. Accordingly, occupancy time of the blade moulds due to post-moulding operations is reduced, preferably eliminated, providing for a more efficient use of overall resources and equipment.

Preferably, the method further comprises iteratively repeating said step of transferring, to transfer said subsequent cured blade elements to the respective cradles. Preferably, the method further comprises iteratively repeating the steps of forming a reinforced section on the cured blade element of the first blade shell in the first cradle, and of forming a reinforced section on the cured blade element of the second blade shell in the second cradle.

Relating to the step of bonding, preferably, the method further comprises the step of performing at least one intra-bonding operation on at least one of said blade shells in at least one of said first and second cradles, during the step of bonding said first blade shell with said second blade shell to form a wind turbine blade. Preferably, said at least one intra-bonding operation is selected from one or more of the following: a blade shell repair operation, a surface grinding operation, a coating operation, a blade root flange finishing operation.

Relating to the steps of curing, preferably the method further comprises the step of performing at least one intra-curing operation on at least one of said blade elements in at least one of said moulds, during the step of curing said blade element. Preferably, said at least one intra-curing operation is selected from one or more of the following: a grinding operation, a blade shell repair operation.

Preferably, said first cradle is hingedly coupled to said second cradle, wherein a closing mechanism is operable to hinge said first cradle relative to said second cradle. Preferably, said first cradle is translationally moveable relative to said second cradle when said first and second cradles are closed, to align a first blade shell with a second blade shell within said closed cradle to form a wind turbine blade.

Preferably, the cured blade elements are received in the respective cradles with the internal surfaces of the subsequently completed blade shells facing upwards. Preferably, the cradles are configured such that the first and second cradles are positioned adjacent each other. Accordingly, a hinging operation of one cradle with respect to the other provides an effective method of closing for the contained blade shells. As the closing operation can be performed using the cradles, the latter provide the optimum location for the gluing operation to apply adhesive to one or both of the contained blade shells. Preferably, said first and second cradles are arranged to apply a bonding pressure to said first and second blade shells when said first and second cradles are closed.

As the bonding of the shells may require the application of a bonding pressure to the shells to be bonded, the cradles may be arranged to force the shells together to produce an effective bonding of the shells. Preferably, at least one of said cradles comprises a pressure member extending along substantially the length of said cradle. Preferably, said pressure member is operable to apply a pressure along a portion of the length of a blade shell received within said cradle. Preferably, said pressure member is operable to apply a bonding pressure along an edge of a blade shell received within said cradle.

Preferably, said wind turbine blade shell comprises a profiled shell body having a leading edge side and a trailing edge side. In a further embodiment, at least one cradle is rotatable about a central longitudinal axis of said cradle. By providing a rotatable cradle, access to different sections of a contained blade shell may be improved by rotating the cradle and contained shell.

A single cradle may be rotatable about its own longitudinal axis. Additionally or alternatively, the first and second cradles may be rotatable about a longitudinal axis when the cradles are closed, to allow for rotation of the wind turbine blade formed from first and second blade shells as the shells are being bonded together in the closed cradles.

In another aspect, the present invention relates to a manufacturing system for the manufacture of a wind turbine blade formed from a pair of cured blade shells bonded together, the system comprising:
   a first blade mould for forming a cured blade element of a first blade shell;
   a second blade mould for forming a cured blade element of a second blade shell;
   a reinforcing station comprising a first cradle for receiving the cured blade element of the first blade shell and for forming a reinforced section on the cured blade element of the first blade shell, and a second cradle for receiving the cured blade element of the second blade shell and for forming a reinforced section on the cured blade element of the second blade shell,
   a closing mechanism operable to close said first and second blade shells to form a wind turbine blade,
wherein each cradle comprises a mould body having a moulding surface, and wherein each cured blade element is arrangable in its respective cradle such that the moulding surface, or a part thereof, abuts against a surface of the cured blade element.

According to a preferred embodiment, each cured blade element is arrangable in its respective cradle such that a section of the moulding surface is placed underneath a part of the cured blade element, said part comprising a recess for receiving the reinforced section. In some embodiments, each cured blade element is arranged in its respective cradle such that a section of the moulding surface is in contact with a section of a bottom surface of the cured blade element, wherein said section of the bottom surface is opposed by a section of a top surface of the cured blade element, said section of the top surface comprising a recess for receiving the reinforced section.

In a preferred embodiment, each cured blade element is arrangable in its respective cradle such that the moulding surface, or a part thereof, abuts against a surface of the cured blade element to form a seal therebetween.

The use of such a manufacturing system provides for a relatively quick and efficient manufacture of wind turbine blade, allowing for maximum effective blade mould usage. The closing mechanism is operable to bond said first and second blade shells together, to form a wind turbine blade having an upwind and a downwind section. In one embodiment, said reinforcing station is local to said first and second blade moulds. Alternatively, said reinforcing station is remote from said first and second blade moulds. Preferably, the reinforcing station comprises said closing mechanism.

In a preferred embodiment, the mould body of the cradle comprises a plurality of movable suction cups embedded in the moulding surface for engaging a surface of the cured blade element. The suction cups may advantageously be movable between an advanced position for engaging a surface of the cured blade element and a retracted position for forcing a surface of the cured blade element against the moulding surface of the mould body.

In a preferred embodiment, each suction cup is movable via an airtight passage provided within the mould body. Such airtight passage may be provided by an airtight sleeve or sheath arranged within the mould body, allowing linear movement of a support member, such as a rod or bar, to which the suction cup is fixed. The support member may be connected to an actuator, such as a pneumatic or hydraulic actuator, for effecting movement of the support member and the suction cup.

In a preferred embodiment, the moulding surface of the mould body comprises one or more sealing elements. The sealing element(s) may protrude beyond the surrounding moulding surface. According to another embodiment, the sealing element is a sealing strip. In a preferred embodiment, such sealing strip may enclose a section of the moulding surface. The sealing element, such as a sealing strip, may be arranged in a groove provided in the moulding surface.

Preferably, the system further comprises a lifting device operable to demould or remove said first and second cured blade elements from said first and second blade moulds. Preferably, said lifting device is further operable to transfer said first and second cured blade elements to said reinforcing station.

Said first and second blade moulds may together form a blade moulding station. Preferably, said first and second blade moulds are used in a lay-up process of a fibrous composite material to produce said first and second cured blade elements. Preferably, said manufacturing system further comprises an infusion mechanism operable to infuse said fibrous composite material with a resin to cure said fibrous composite material to form said first and second cured blade elements.

In a preferred embodiment, said closing mechanism is coupled to the reinforcing station, said closing mechanism being operable to move said first cradle relative to said second cradle, to close first and second blade shells received in said cradle to form a closed wind turbine blade shell.

The features described above with reference to the method may likewise apply to the manufacturing system of the present invention, and vice versa.

In another aspect, the present invention relates to a wind turbine blade manufactured according to the afore-described method.

DETAILED DESCRIPTION OF THE INVENTION

Certain embodiments of the invention will now be described, by way of example only, with reference to the accompanying drawings, in which.

Figure 5:
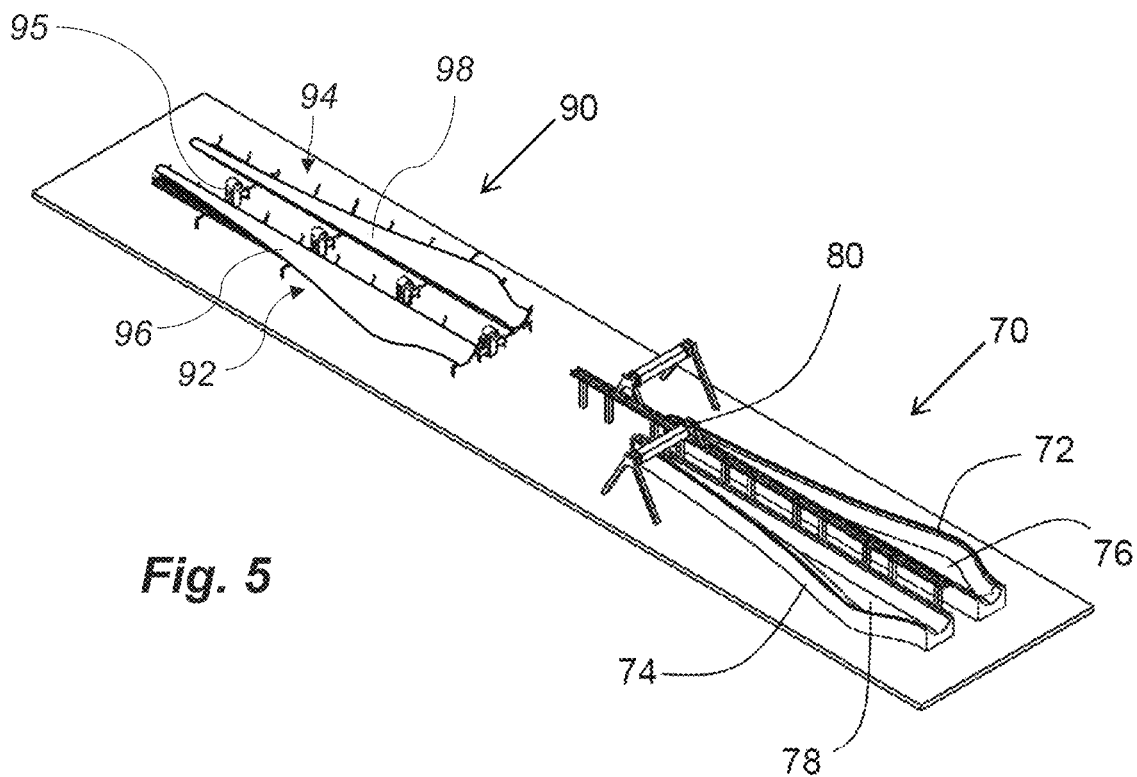

FIG. 5 is a perspective view of a manufacturing system according to the present invention, FIG. 6 is a perspective view of a mould body according to the present invention, FIG. 7 is a partial, enlarged view of a mould body according to the present invention, FIG. 8 is a partial, sectional view of a mould body according to the present invention, FIG. 9 is a perspective view of another embodiment of a mould body according to the present invention, FIG. 10 is a perspective view of another embodiment of a mould body according to the present invention, FIG. 11 shows different sectional views of a mould body according to the present invention, and FIG. 12 is a sectional view of another embodiment of a mould body according to the present invention.

Figure 1:
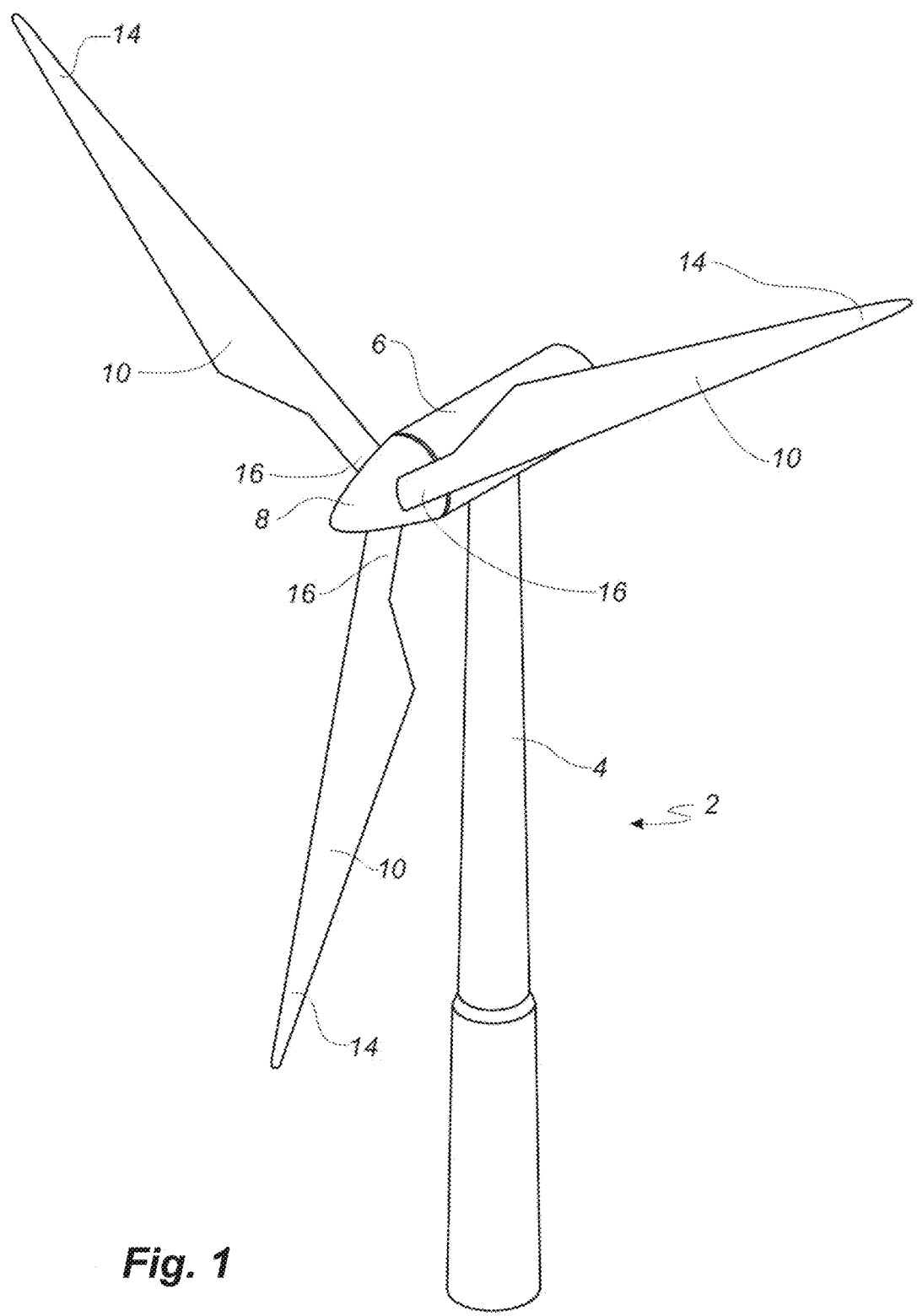
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R. While a three-bladed upwind wind turbine design is presented here, it will be understood that the invention may equally apply to blades of other wind turbine designs, e.g. two-bladed, downwind, etc.

Figure 2:
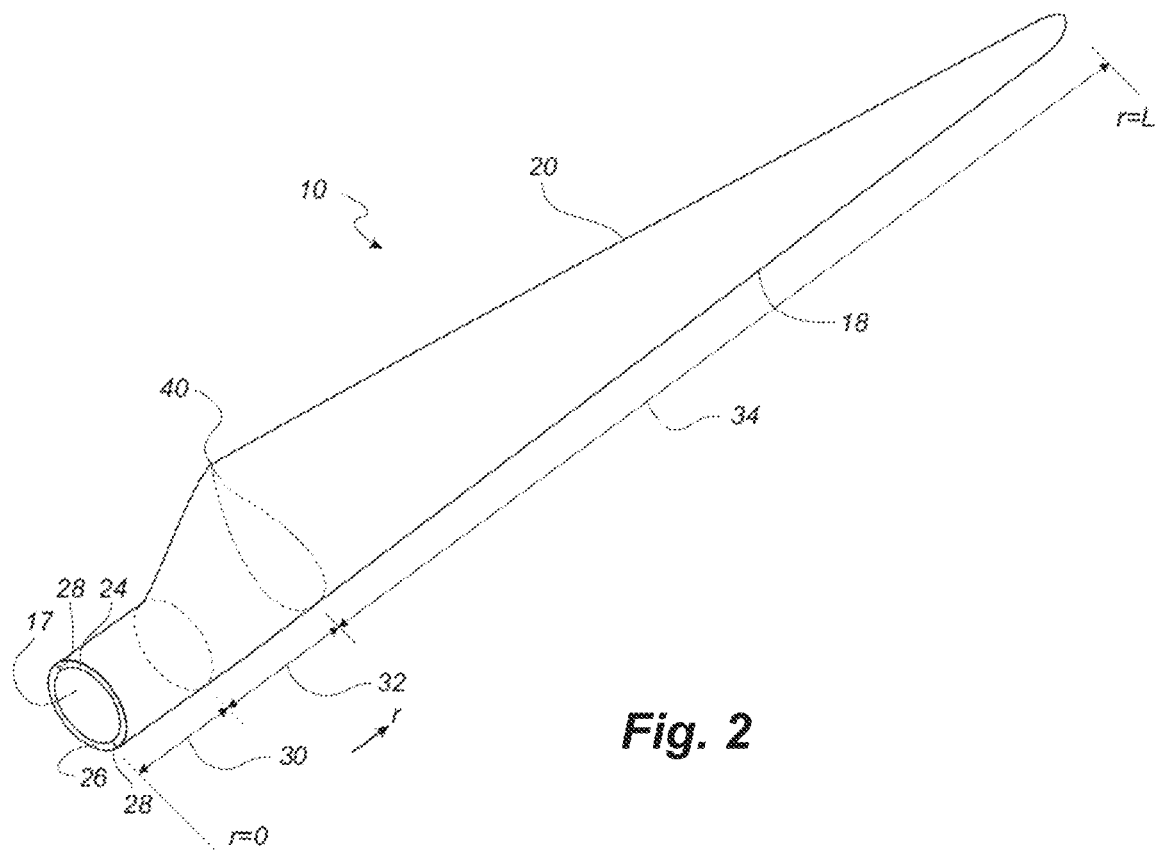
FIG. 2 shows a schematic view of a wind turbine blade.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
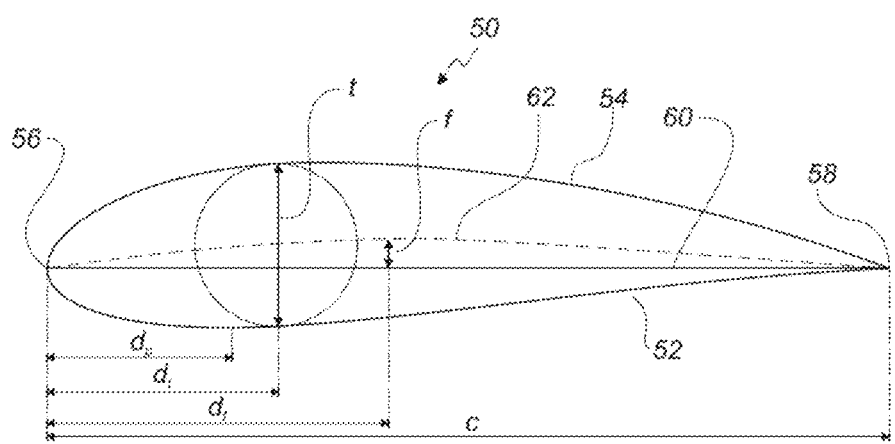
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

The wind turbine blades may further comprise pre-bent blades, wherein the body of the blade is designed having a bend or curve, preferably in the direction of the pressure side of the blade. Pre-bent blades are designed to flex during operation of the wind turbine, such that the blades straighten under the effect of optimum wind speed at the wind turbine. Such a pre-bent blade will provide improved performance during wind turbine operation, resulting in numerous advantages, e.g. tower clearance, swept area, blade weight, etc.

One way of constructing a wind turbine blade 10 comprises forming the blade 10 as two separate shell pieces—a first piece which substantially forms the pressure or upwind side 52 of the blade 10, and a second piece which substantially forms the suction or downwind side 54 of the blade 10. Such shell pieces are normally formed in separate open blade moulds conforming to the aerodynamic shapes of the respective sides, and are subsequently joined together by closing the blade moulds to form a wind turbine blade 10.

Figure 4:
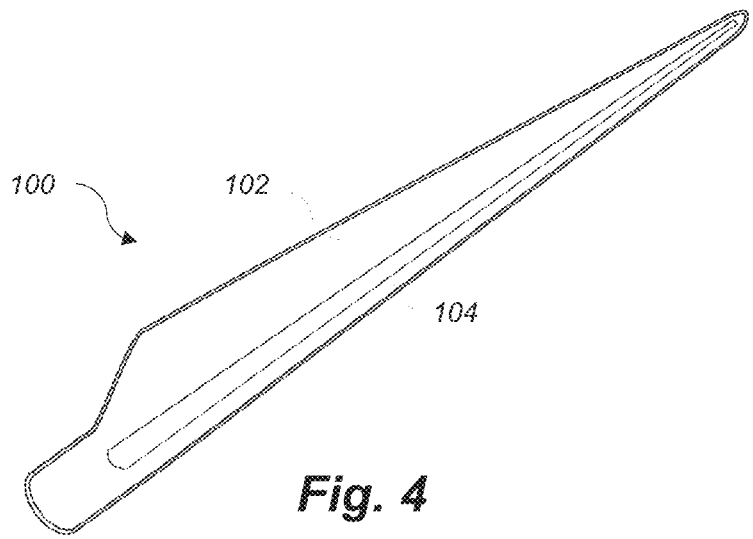
FIG. 4 is a perspective view of a blade shell manufactured using the method of the present invention comprising a cured blade element and a reinforced section.

FIG. 4 shows a perspective view of a blade shell 100 which can be manufactured using the method and system of the present invention, which is made up of a cured blade element 102, which comprises an aerodynamic shell part and a root laminate, and an integrated reinforced section 104, which forms a spar cap or main laminate of the blade shell. The cured blade element 102 may also comprise a number of sandwich core material arranged on lateral sides of the reinforced section 104 (not shown). It will be understood that the invention may apply for the manufacture of straight blades or of pre-bent blades. FIG. 4 generally shows the top surface of the blade shell or cured blade element according to the present invention, while its bottom surface is facing downward in the view of FIG. 4.

An embodiment of a manufacturing system for the manufacture of a wind turbine blade according to the invention is illustrated in FIG. 5. The manufacturing system comprises a blade moulding station 70 and a reinforcing station 90. The blade moulding station 70 comprises a set of first and second blade shell moulds 72, 74. The blade moulds 72, 74 comprise respective first and second internal surfaces 76, 78 which are arranged to produce first and second shaped blade shells having an aerodynamic profile substantially corresponding to respective upwind (or pressure side) and downwind (or suction side) halves of a wind turbine blade.

During manufacture of a wind turbine blade, a lay-up operation is performed at the blade moulding station 70, wherein a plurality of layers of a preferably fibre-based composite material are applied to the internal surfaces 76, 78 of the blade moulds 72, 74. The fibre layers are applied to conform to the mould shape, and may be arranged at various thicknesses or densities dependent on the structural requirements of the wind turbine blade to be manufactured.

In the embodiment shown in FIG. 5, the blade moulding station 70 is provided with an automatic fibre lay-up apparatus 80, which allows for machine-controlled lay-up of the layers of fibre-based material in the blade moulds 72, 74. The automatic fibre lay-up apparatus comprises at least one fibre applicator device suspended on a moveable gantry provided above the blade moulds 72, 74, the at least one fibre applicator device operable to move along the length of the blade moulds 72, 74 to apply fibre layers, e.g. fibre tape, to the internal surfaces 76, 78 of the blade moulds 72, 74.

However, it will be understood that the manufacturing system of the invention may be implemented using any suitable lay-up mechanism, e.g. hand lay-up. Furthermore, the layup operation may comprise the use of pultruded elements or pre-pregs of composite material within the blade moulds, either as an alternative to or in addition to the layers of fibre-based material.

Once sufficient layers of the fibre-based material have been applied to the surfaces of the moulds 72, 74, a curing operation is then performed to cure the fibre layers to a relatively hardened state. In one embodiment, this may comprise applying a cover or vacuum bag over the fibre layers to form a container, and subsequently applying a vacuum pressure to the interior of the container defined by the vacuum bag and the surface of the blade mould 72, 74.

A curing resin is then infused or injected into the interior of the container, the resin spreading throughout the fibre layers by the action of the vacuum pressure. The resin is then allowed to cure and accordingly harden and join the layers of fibre-based material into a cured blade element, preferably comprising a cavity for later integration of a reinforced section (not shown); the cured blade element having a structural profile corresponding to the shape of the surface of the blade moulds 72, 74.

The term "cured blade element" is used herein to refer to blade elements which have been substantially cured by the curing operation, preferably to a level where the blade elements can be handled without undergoing significant deformation of the shell structure. The duration of the curing operation performed will depend on the type of curing resin used in the manufacture of the blade shells, but may be of the order of 2-3 hours using standard resins. However, it will be understood that the blade elements themselves may continue to undergo a curing process within the body of the blade elements for several hours after the denoted curing operation.

Accordingly, once the blade elements have substantially cured, the associated cover or vacuum bag may be removed, and the cured blade elements can be demoulded from the blade moulds 72, 74. To demould the blade elements, any manufacturing equipment which may be provided above the blade moulds 72, 74, e.g. automatic fibre applicator device 80, may be removed, and a lifting apparatus (not shown) may be positioned above the blade elements contained in the blade moulds 72, 74. The lifting apparatus is operable to lift the cured blade elements out of the blade moulds 72, 74, and to transfer the cured blade elements to the reinforcing station 90, where reinforcing and optionally post-moulding operations may be performed.

It will be understood that the transferring operation may be performed using any suitable lifting apparatus for the transferral of a wind turbine blade elements, e.g. a vacuum lifting device, a crane, a manual lifting operation, etc.

The reinforcing station 90 comprises a first cradle 92 and a second cradle 94 each comprising a mould body 96, 98 supported by respective support frames. Each cured blade element can be arranged in its respective cradle for forming a reinforced section on the cured blade element of each blade shell. Forming of the reinforced section will typically include the lay-up of additional fibre material on the cured blade element, preferably in cavity prepared therein, followed by vacuum-assisted resin infusion and curing.

The first and second cradles 92, 94 are arranged in a parallel longitudinal relationship, the first cradle 92 being coupled to the second cradle 94 via a plurality of hinging mechanisms 95. The first cradle 92 is arranged to be hinged relative to the second cradle 94, such that the first cradle 92 is positioned above the second cradle 94 to form a closed arrangement. The first cradle 92 may also be translationally movable relative to the second cradle 94 when in the closed position, in order to correct the alignment between the first and second cradles 92, 94. The first cradle 92 may be moveable along the horizontal and/or vertical axis with respect to the second cradle 94.

Examples of post-moulding operations which can be performed at the reinforcing station 90 on the blade shells can include, but are not limited to: a blade shell repair operation, involving a repair of any minor defects in a cured blade shell; a blade shell cutting or grinding operation, wherein a portion of a surface of the cured blade shell can be cut away or ground to present a relatively smooth profile; a blade root flange coupling operation, wherein a pair of blade root flanges which are provided on first and second blade shells are coupled together to form a single integral blade root flange; a gluing operation, wherein an adhesive is applied to a surface of a blade shell to bond components or blade shells together; a coating operation, wherein an external surface of a blade shell is coated with a coating layer, e.g. a gel coat or suitable erosion resistant material; a laminate installation operation, wherein a main laminate or other element of the interior of a wind turbine blade may be fixed to an internal surface of one of the blade shells for positioning in the interior of a wind turbine blade; an overlamination operation; installation of internal blade components, e.g. load or deflection monitoring sensors, lightning protection systems, etc.; a survey of blade shell geometry; a secondary curing operation in, for example, an oven; or any other suitable manufacturing or assembly operations.

FIG. 6 illustrates one embodiment of a cradle 92 according to the present invention. The cradle 92 comprises a mould body 96 having a moulding surface 97. The mould body 96 is supported by a support frame 99. The mould body 96 also comprises a plurality of movable suction cups 100 embedded in the moulding surface for engaging a surface of the cured blade element. This is best seen in the partial sectional view of FIG. 8 taken along the hatched line in FIG. 6.

By contrast to FIG. 6, FIG. 8 shows the mould body in a situation where the cured blade element 102 has already been received therein. The suction cup 100 is movable, e.g. by a linearly displaceable rod 105, between an advanced position for engaging a bottom surface of the cured blade element 102 (see FIG. 8a) and a retracted position for forcing a bottom surface of the cured blade element 102 against the moulding surface of the mould body 96 (see FIG. 8b). In the embodiment illustrated, the suction cup 100 is movable via an airtight sheath 103 provided within the mould body, allowing linear movement of the rod 105 to which the suction cup 100 is fixed. This arrangement allows for improved resin infusion during the formation of the reinforced section since the tightness of the arrangement no longer depends on the tightness of the cured blade element. The moulding surface abutting against a surface of the cured blade element 102 to form a seal therebetween provides the require tightness independent of the thickness or material of the cured blade element. FIG. 8b also illustrates a vacuum bag 120 held in place by adhesive tape 122, which is applied on an edge of the mould body prior to vacuum-assisted resin infusion. During the vacuum-assisted resin infusion, the shell part will be pressed towards the mould surface to keep the aerodynamic shape of the profile. In this embodiment, it is advantageous that the sheaths of the suction cups are airtight.

The partial enlarged view of FIG. 7 illustrates another embodiment of the present invention. Here, the support frame 99 comprises a stationary support member 99a and a movable support member 99b hinged to the stationary support member 99a via a hinge 108. In particular in combination with a deformable mould body 96, this mechanism may be used to adjust the leading and trailing edges of the blade shells prior to closing and bonding.

FIG. 9 illustrates another embodiment of a cradle 92 according to the present invention. Again, the cradle 92 comprises a mould body 96 having a moulding surface 97. The mould body 96 is supported by a support frame 99. The moulding surface 97 of the mould body 96 comprises a sealing element 110 in the form of a sealing strip enclosing a section 112 of the moulding surface. Thus, the cured blade element can be arranged in the cradle 92 such that the section 112 of the moulding surface enclosed by the sealing element 110 is placed underneath a part of the cured blade element, said part comprising a recess for receiving the reinforced section. This is best seen in the sectional views of FIG. 11, which is taken along the hatched line in FIG. 9. The embodiment shown in FIG. 10 additionally comprises a plurality of movable suction cups 100 embedded in the moulding surface for engaging a surface of the cured blade element.

FIG. 11 shows different sectional views of one embodiment of a mould body 96 according to the present invention, taken along the hatched line in FIG. 9, but shown without the support frame. As seen in FIG. 11a, the mould body 96 comprises a groove 116 enclosing a section 112 of the moulding surface. A sealing strip 110 is arranged in the groove 116, see FIG. 11b. As seen in FIG. 11c, a cured blade element 102 is placed into the mould body 96, the cured blade element 102 comprising a recess 114 for later forming of an integrated reinforced section therein. The section 112 of the moulding surface enclosed by the sealing element 110 is located underneath the part of the cured blade element 102 which comprises the recess 114 for receiving the reinforced section 104 (see FIG. 11d). Thus, an efficient vacuum-assisted resin transfer is enabled by the seal provided underneath the relevant part of the cured blade element 102.

FIG. 12 shows a sectional view of another embodiment of a mould body for a cradle according to the present invention. Here, the mould body 116 is provided such that it contacts only part of the lower surface of a cured blade element 102. Again, a sealing strip 110 is provided to enclose part of the moulding surface which is provided for forming a reinforced section 104 on the cured blade element 102. In this embodiment, the cradle may comprise a plurality of movable suction cups 100 placed outside of the enclosed sealed section 104 for engaging a surface of the cured blade element 102 and to secure the cross section geometry. In this embodiment, the suction cups 100 may be arranged outside of the mould body 116. A local vacuum bag may be fastened using an adhesive tape on the cured blade element 102 around the reinforced section (not shown). In this case the suction cups and their respective linearly displaceable rods 105 could be provided even without airtight sheaths.

The invention is not limited to the embodiment described herein, and may be modified or adapted without departing from the scope of the present invention.

The invention claimed is:

1. A method of manufacturing a wind turbine blade, the method comprising the steps of:
   forming a cured blade element (102) of a first blade shell;
   forming a cured blade element (102) of a second blade shell;
   transferring the cured blade element (102) of the first blade shell to a first cradle (92);
   transferring the cured blade element of the second blade shell to a second cradle (94), wherein each cradle comprises a mould body (96, 98) having a moulding surface (97), and wherein each cured blade element is arranged in its respective cradle such that the moulding surface (97), or a part thereof, abuts against a surface of the cured blade element (102);

forming a reinforced section (104) on the cured blade element of the first blade shell in the first cradle;

forming a reinforced section (104) on the cured blade element of the second blade shell in the second cradle;

closing said first and second blade shells (100) to form a closed wind turbine blade shell; and bonding said first and second blade shells in said closed wind turbine blade shell to form a wind turbine blade.

2. The method according to claim 1, wherein each cured blade element (102) is arranged in its respective cradle such that a section of the moulding surface is placed underneath a part of the cured blade element (102), said part comprising a recess for receiving the reinforced section.

3. The method according to claim 1, wherein each cured blade element is arranged in its respective cradle such that the moulding surface (97), or a part thereof, abuts against a surface of the cured blade element (102) to form a seal therebetween.

4. The method according to claim 1, wherein the mould body (96) comprises a plurality of movable suction cups (100) embedded in the moulding surface (97) for engaging a surface of the cured blade element.

5. The method according to claim 4, wherein the suction cups (100) are movable between an advanced position for engaging a surface of the cured blade element (102) and a retracted position for forcing a surface of the cured blade element (102) against the moulding surface of the mould body (96).

6. The method according to claim 1, wherein the moulding surface of the mould body (96) comprises one or more sealing elements (110).

7. The method according to claim 6, wherein the sealing element (110) is a sealing strip enclosing a section (112) of the moulding surface.

8. The method according to claim 6, wherein each cured blade element (102) is arranged in its respective cradle such that a section of the moulding surface enclosed by the sealing element is placed underneath a part of the cured blade element (102), said part comprising a recess for receiving the reinforced section.

9. The method according to claim 1, wherein the mould body (96, 98) is elastically deformable.

10. The method according to claim 1, wherein the first cradle (92) is hingedly coupled to the second cradle (94).

11. The method according to claim 1, wherein the reinforced section is a main laminate, a spar cap or a spar beam.

12. The method according to claim 1, wherein the method comprises the step of turning said first blade shell relative to said second blade shell to form a closed blade shell, and wherein the bonding step is performed on the closed blade shell to form a wind turbine blade.

13. The method according to claim 1, wherein the method further comprises the step of aligning the first blade shell with the second blade shell such that a leading edge and a trailing edge of the first blade shell are in register with a respective leading edge and a respective trailing edge of the second blade shell during said bonding step.

14. A manufacturing system for the manufacture of a wind turbine blade formed from a pair of cured blade shells bonded together, the system comprising:

a first blade mould (72) for forming a cured blade element (102) of a first blade shell;

a second blade mould (74) for forming a cured blade element (102) of a second blade shell;

a reinforcing station (90) comprising a first cradle (92) for receiving the cured blade element of the first blade shell and for forming a reinforced section (104) on the cured blade element of the first blade shell, and a second cradle (94) for receiving the cured blade element of the second blade shell and for forming a reinforced section (104) on the cured blade element of the second blade shell; and a closing mechanism operable to close said first and second blade shells to form a wind turbine blade, wherein each cradle (92, 94) comprises a mould body (96, 98) having a moulding surface, and wherein each cured blade element (102) is arrangeable in its respective cradle such that the moulding surface, or a part thereof, abuts against a surface of the cured blade element.

15. The manufacturing system according to claim 14, wherein each cured blade element (102) is arrangeable in its respective cradle such that a section of the moulding surface is placed underneath a part of the cured blade element (102), said part comprising a recess for receiving the reinforced section.

16. The manufacturing system according to claim 14, wherein each cured blade element (102) is arrangeable in its respective cradle such that the moulding surface, or a part thereof, abuts against a surface of the cured blade element to form a seal therebetween.

* * * * *